(12) United States Patent
Coughlan et al.

(10) Patent No.: US 11,945,561 B2
(45) Date of Patent: Apr. 2, 2024

(54) EFFICIENT UNDERSEA CHARGING OF UNDERSEA AUTONOMOUS VEHICLES

(71) Applicant: SUBCOM, LLC, Eatontown, NJ (US)

(72) Inventors: David R. Coughlan, Lititz, PA (US); Stanley C. Wisniewski, II, Cream Ridge, NJ (US); Lara Denise Garrett, Red Bank, NJ (US); Christopher Carobene, Eatontown, NJ (US)

(73) Assignee: SubCom, LLC, Eatontown, NJ (US)

( * ) Notice: Subject to any disclaimer, the term of this patent is extended or adjusted under 35 U.S.C. 154(b) by 439 days.

(21) Appl. No.: 17/327,675

(22) Filed: May 22, 2021

(65) Prior Publication Data

US 2021/0394879 A1 Dec. 23, 2021

Related U.S. Application Data

(60) Provisional application No. 63/042,868, filed on Jun. 23, 2020.

(51) Int. Cl.
| | | |
|---|---|---|
| *B63G 8/00* | (2006.01) | |
| *B60L 53/126* | (2019.01) | |
| *B60L 53/18* | (2019.01) | |
| *B60L 53/30* | (2019.01) | |
| *B60L 53/66* | (2019.01) | |

(52) U.S. Cl.
CPC .......... *B63G 8/001* (2013.01); *B60L 53/126* (2019.02); *B60L 53/18* (2019.02); *B60L 53/305* (2019.02); *B60L 53/66* (2019.02); *B63G 2008/008* (2013.01)

(58) Field of Classification Search
CPC ....... B63G 8/001; B60L 53/126; B60L 53/66; B60L 53/305
See application file for complete search history.

(56) References Cited

U.S. PATENT DOCUMENTS

| | | | | |
|---|---|---|---|---|
| 5,719,693 A | * | 2/1998 | Tanoue | H04B 10/29 398/178 |
| 7,183,742 B2 | * | 2/2007 | Potter | B63G 8/001 320/101 |

(Continued)

FOREIGN PATENT DOCUMENTS

| | | |
|---|---|---|
| GB | 2365895 A | 2/2002 |
| WO | 2001021476 A1 | 3/2001 |
| WO | 2012156425 A2 | 11/2012 |

OTHER PUBLICATIONS

European Search Report dated Nov. 11, 2021, for the EP Patent Application No. 21176335.4, filed on May 27, 2021, 9 pages.

(Continued)

*Primary Examiner* — S. Joseph Morano
*Assistant Examiner* — Jovon E Hayes
(74) *Attorney, Agent, or Firm* — KDW Firm PLLC (57) ABSTRACT

A docking/charging module for an undersea autonomous vehicle comprises a housing allowing the undersea autonomous vehicle to dock, thereby establishing both a data connection and a power connection between the module and the vehicle, the module being equipped with the battery which is charged from an undersea cable having a power conductor which may charge the undersea autonomous vehicle via the power connection when the undersea autonomous vehicle is docked with or in proximity to the docking/charging module.

17 Claims, 7 Drawing Sheets

(56) References Cited

U.S. PATENT DOCUMENTS

| | | | |
|---|---|---|---|
| 9,325,431 B2* | 4/2016 | Lecroart | H04B 13/02 |
| 9,845,137 B2* | 12/2017 | Lelaurin | B63B 27/16 |
| 9,873,496 B2* | 1/2018 | Rokkan | G01V 1/3852 |
| 9,969,470 B2* | 5/2018 | Brizard | B63C 11/42 |
| 10,358,042 B2* | 7/2019 | Nemoto | H02K 7/1823 |
| 2003/0021556 A1* | 1/2003 | Toth | H02G 15/14 |
| | | | 385/100 |
| 2003/0108351 A1* | 6/2003 | Feinberg | H04B 10/808 |
| | | | 398/175 |
| 2006/0054074 A1* | 3/2006 | Wingett | B63G 8/001 |
| | | | 114/312 |
| 2009/0114140 A1* | 5/2009 | Guerrero | B63C 11/52 |
| | | | 114/321 |
| 2019/0016419 A1* | 1/2019 | Sheldon-Coulson | F03B 13/20 |
| 2021/0394879 A1* | 12/2021 | Coughlan | B60L 53/66 |

OTHER PUBLICATIONS

Kassab Gilberto et al.: "Uk-Brazil Subsea Technology Catalogue", Dec. 31, 2016 (Dec. 31, 2016), pp. 1-296, XP055860534,http://antigo.mctic.gov.br/mctic/export/sites/institucional/arquivos/publicacao/petroleo_gas/-MCTI_Catalogo_PD_A4_ingles_versao_2016_1_-_27-7-2016.pdf.

* cited by examiner

FIG. 7

EFFICIENT UNDERSEA CHARGING OF UNDERSEA AUTONOMOUS VEHICLES

RELATED APPLICATIONS

This application claims the benefit of U.S. Provisional Patent App. No. 63/042,886, filed Jun. 23, 2020, the contents of which are incorporated herein in their entirety.

FIELD OF THE INVENTION

This invention Field of undersea autonomous vehicles (UAVs), and, in particular, to the charging of batteries that power these vehicles.

BACKGROUND

Underwater autonomous vehicles typically comprise robots operating independently underwater. Such vehicles may be remotely controlled or may be controlled by onboard software to perform a specific task. UAVs may be deployed to perform a variety of tasks in the commercial, research and military sectors. For example, the oil and gas industry may use UAVs to make detailed maps of the seafloor prior to installing subsea infrastructure or pipelines. Scientists may use UAVs equipped with a wide variety of sensors to measure various aspects of the undersea environment. The military has many applications for UAVs, including, for example, intelligence gathering, surveillance and reconnaissance as well as wartime activities, for example, payload delivery and mine countermeasures.

UAVs are typically powered by rechargeable batteries. One limitation of UAVs having rechargeable batteries is that battery recharging must occur at regular intervals, depending on the intensity of the task performed. Several methods currently exist for recharging UAV batteries including physical removal of the UAV from the undersea environment to land, by bringing the UAV on board a ship for recharging or by lowering a charging port from a ship into the undersea environment. In other instances, the UAV may return to the surface and connect to a platform for recharging where the platform may be solar-powered, motion-powered or wind-powered. However, it is inefficient to have the UAV removed from its primary activities to travel to shore or to be recovered at sea to recharge the batteries. In addition, requiring surface activity to recharge the batteries of the UAV exposes the UAV to undesirable surveillance and the dangers of severe weather.

One or more charging stations have been deployed on the seafloor to which the UAV may connect to recharge its batteries. Such charging stations are typically connected to undersea cables having power capacity which is used to charge the UAV when connected to the station. Undersea cables typically have a power capacity which has relatively high voltage but low current. As such, the time it may take to recharge the batteries of the UAV may be unacceptable.

It is therefore desirable to provide a more efficient means of recharging the UAV, while maintaining the UAV in the undersea environment.

SUMMARY OF THE INVENTION

The invention comprises a docking/charging station to which a UAV may physically or wirelessly dock. The docking/charging station is configured with a battery or other power storage device which is slowly charged from the power conductors in a branch cable of an undersea communications system while the UAV is undocked from the docking/charging station. When the UAV docks with the docking/charging station, the batteries on board the UAV may be quickly charged using the battery on board the docking/charging station. The docking/charging station may also be configured with data transmission and reception hardware allowing data collected by and stored on the UAV during its mission to be transferred to/from the docking/charging station and thereafter transferred via the optical fibers in the branch cable to an on-shore facility.

BRIEF DESCRIPTION OF THE DRAWINGS

FIG. 2 is a schematic representation of power being diverted from a trunk cable to a branch cable, as shown in FIG. 2(A) and power in the trunk cable being isolated from the branch cable, as shown in FIG. 2(B).

FIG. 3 shows a schematic representation of optical fibers from a trunk cable being diverted into a branch cable, in FIG. 3(B) and, in FIG. 3(A), the optical fibers being diverted away from the branch cable.

DETAILED DESCRIPTION

Undersea communication systems typically employ undersea cables comprising one or more fiber-optic cables, each having one or more pairs of optical fibers, and one or more power conductors. One embodiment of an undersea communication system 100 is shown in schematic form in FIG. 1. The communication system 100 may be a long-haul submarine system configured to carry optical channels from a transmitting terminal to a receiving terminal over cables of varying lengths. The communication system 100 may comprise a trunk cable 102 which may terminate at a land-based cable landing station (CLS) 110 at each end of the cable. Each cable landing station may include power feed equipment (PFE) 112 for powering cable 102 and line terminating equipment (LTE) 114 for transmitting and receiving optical signals therebetween.

Figure 1:
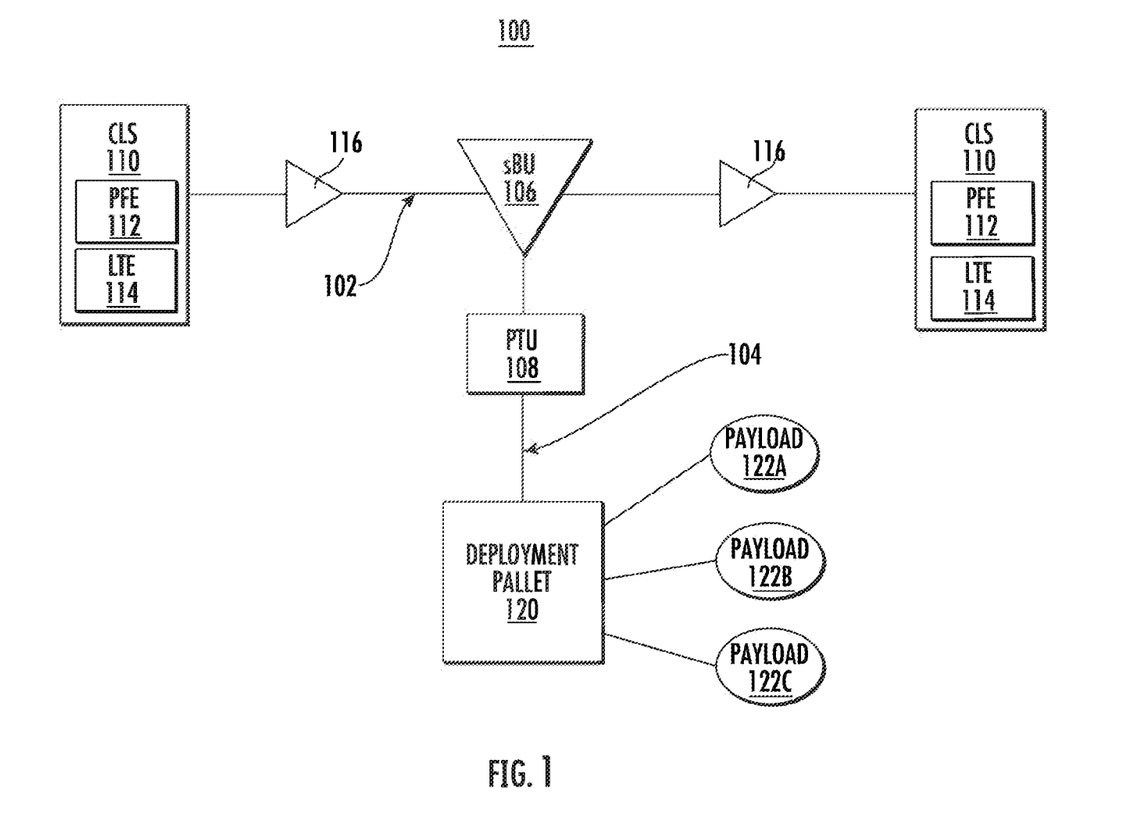
FIG. 1 is a block diagram of a typical undersea communication system in accordance with embodiments of the invention.

The communication system 100 transmits a plurality of optical channels over optical fibers housed within cable 102. The system may be bidirectional wherein each LTE 114 includes receivers and transmitters, and each fiber pair is used for bidirectional communication. Communication system 100 may use dense wavelength division multiplexing (DWDM) to transmit communication channels on the optical fibers. The undersea cables typically include at least one power conductor to power multiple undersea repeaters 116 disposed between the cable landing stations used to amplify the DWDM signals as well as various other components. The power conductor may be powered from PFE 112 located on shore on either end of the cable. PFE 112 typically supplies between 10 kV and 20 kV to the optical cable system but other voltages may be used. In some embodiments, branch cables 104 may be dual conductor cables which may conduct power from the trunk and connect back to the trunk to avoid having to use earth ground, as would be required with a single conductor branch cable. One or more branch cables 104 may be connected to trunk cable 102 at various locations. The branch cable 104 may terminate on shore at a CLS 110 (not shown in FIG. 1) or undersea to a deployment pallet 120 as shown in FIG. 1. A branch cable 104 that terminates undersea may be used to transfer data to/from various payloads 122A . . . 122C connected to deployment pallet 120 and to provide power to the various payloads. Payloads 122A . . . 122C may be, for example, sensor arrays of varying types.

Figure 2A:
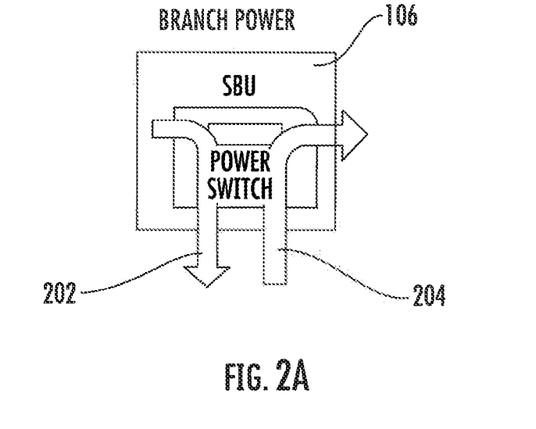
Figure 2B:
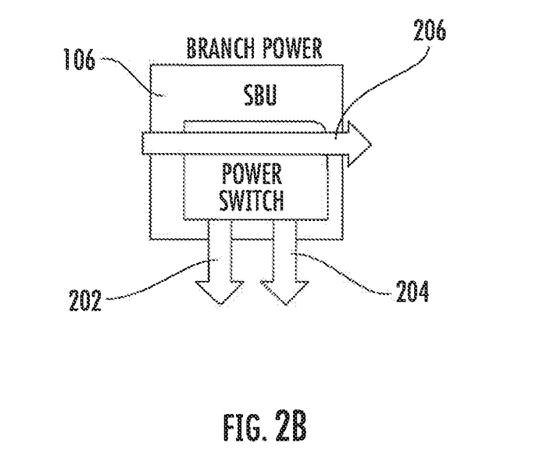
Figure 3A:
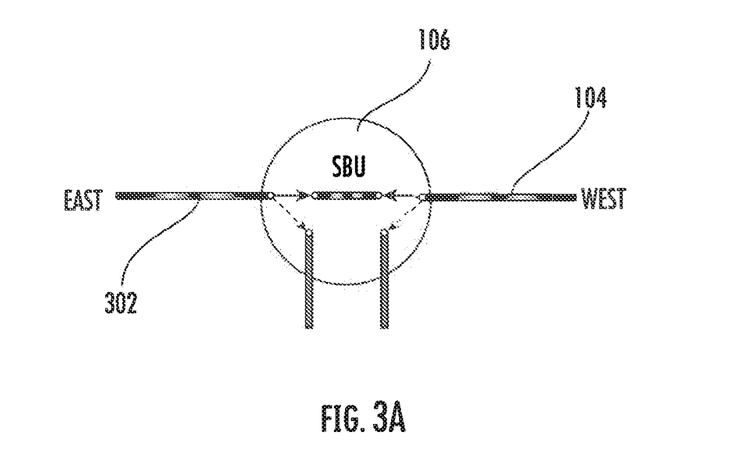
Figure 3B:
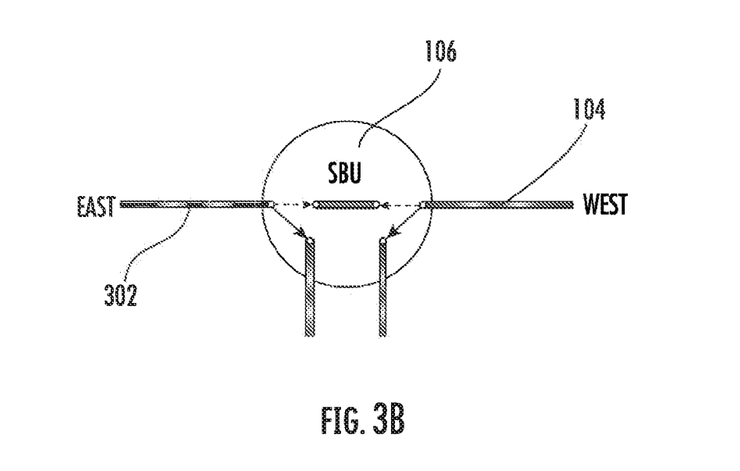

Trunk cable 102 may include a switch branching unit (sBU) 106, which is capable of switching both power and DWDM optical channels to the branch cable 104. FIG. 2(A) shows power from the trunk cable 102 being diverted to branch cable 104 via conductor 202 and returning to trunk cable 102 via conductor 204. FIG. 2(B) shows branch cable 104 in an unpowered, bypassed state with the power from trunk cable 102 bypassing branch cable 104 via the single conductor 206 in trunk cable 102. The sBU 106 may be configurable from shore via LTE 114 by sending optical signals on command channels to sBU 106. The communication signals on the optical fibers in trunk cable 102 may be diverted to branch 104 as shown in FIG. 3(B). FIG. 3(A) shows optical fibers 302 bypassing branch cable 104. It should be noted that, while FIG. 3 appears to show signals on only one fiber pair being diverted to branch cable 106, it is also possible to divert communication signals on multiple pairs of optical fibers from trunk cable 102 to branch cable 104 on a per-pair basis. In some embodiments, it may be possible to send all wavelengths of light in the optical fibers to the branch cable or to drop or add various wavelengths of light.

Returning to FIG. 1, one or more deployment pallets 120 may be connected to branch cable 104. Deployment pallet 120 serves as a base to which one or more payloads 122 may be connected. Payloads 122 may include, for example, various types of sensor arrays or other equipment having commercial, research or military applications. For example, payload 122A may comprise a seismograph to collect seismic readings from the ocean floor. Deployment pallet 120 may pass power to payloads 122 from branch cable 104. In addition, deployment pallet 120 may enable bidirectional communication with payloads 122, allowing both the collection of data collected by payloads 122 and the issuing of commands to configure payloads 122. Deployment pallet 120 may be equipped with a plurality of commercially-available wet mate connectors or other types of connectors such that the one or more payloads 122 may be easily connected to or disconnected from deployment pallet 120. It is also possible to make the power and data connections using wireless technology. Alternatively, a single payload 122 may connect directly to branch cable 104 without deployment pallet 120.

Because trunk cable 102 typically operates at 10 kV to 20 kV, the power delivered to branch cable 104 may be conditioned by the power transfer unit (PTU) 108. PTU 108 may comprise a DC-to-DC converter module (DDCM) which may step the voltage down from the high level at trunk cable 102 to a lower level required by payloads 122 attached to branch cable 104. In some embodiments, PTU 108 may be controllable from shore by sending command signals via one or more side carrier bands or command bands in the optical fibers to control the level of voltage delivered to payloads 122 attached to branch cable 104 and, in addition, the level of current. PTU 108 thus isolates payloads 122 from the high trunk voltage. PTU 108 may be controllable to provide constant current or constant voltage operation to payloads 122 and may be set to limit the output power to a value less than its full output power potential.

Figure 4:
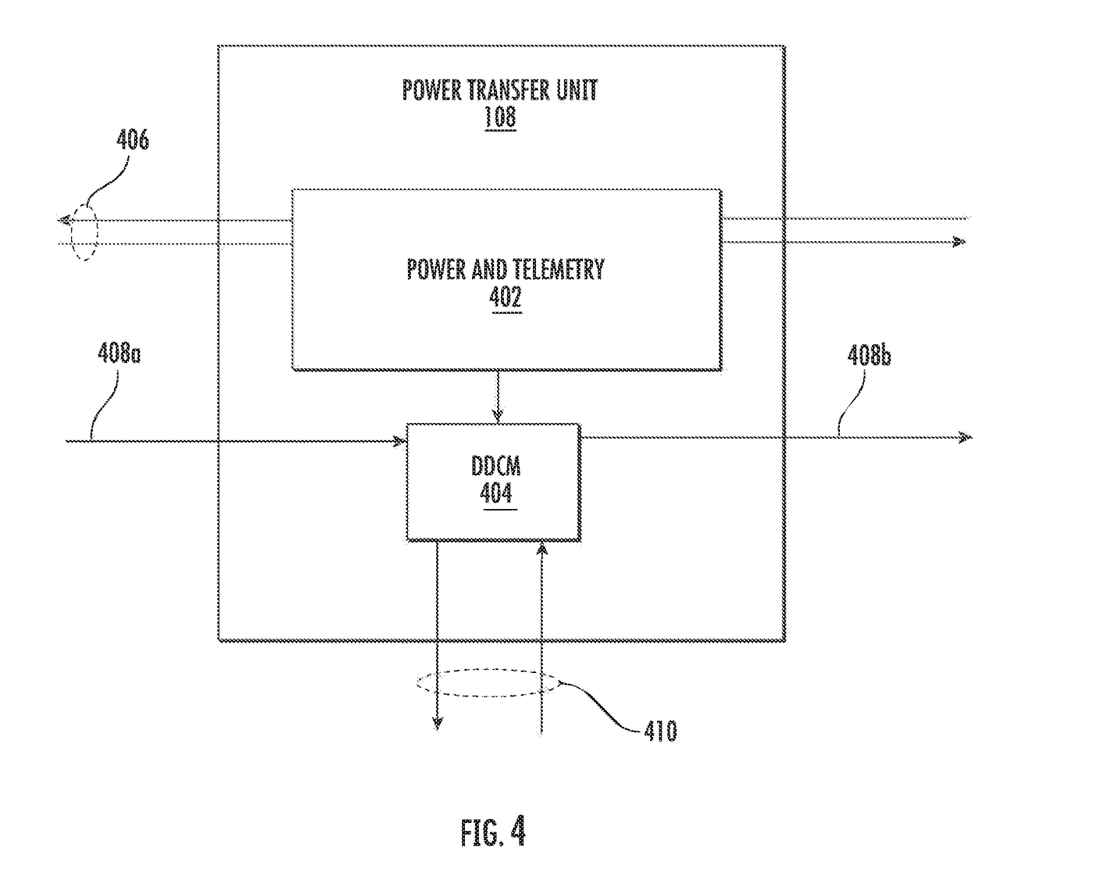
FIG. 4 is a block diagram of a power transfer unit containing a DC-to-DC conversion module (DDCM) for conditioning power to be used by undersea payloads.

FIG. 4 is a block diagram of PTU 108. PTU 108 couples to branch cable 104 downstream of sBU 106. It is assumed, for purposes of explanation, that branch cable 104 has two power conductors 408a and 408b. Trunk cable 102 may have a single power conductor or dual power conductors. PTU 108 includes a power and telemetry unit 402 which include circuitry and components suitable for sending and receiving optical signals via the optical fibers 406 in branch cable 104. In such cases, sBU 106 must be configured to pass optical signals from fibers in trunk cable 102 to fibers in branch cable 104. Power and telemetry unit 402 uses the received optical signals to configure and adjust the operation of the DC-DC converter module (DDCM) 404, for example, to apply new operating parameters such as voltage setpoints and source mode (constant current, constant voltage). Conditioned voltage is output from PTU 108 at 410 to downstream destinations, for example, deployment pallet 120 to power one or more payloads 122.

Figure 5:
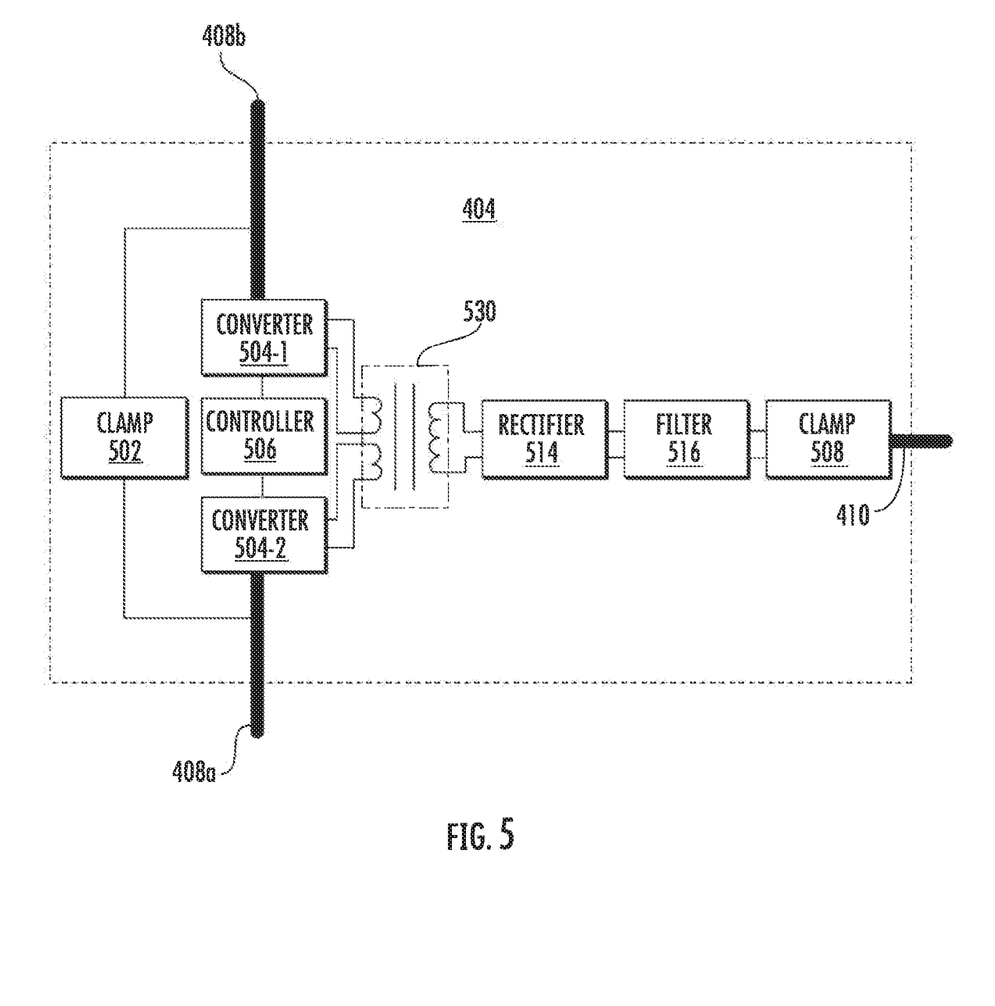
FIG. 5 is a block diagram of one possible embodiment of the DDCM shown in FIG. 4.

FIG. 5 is a diagram showing one possible embodiment of DDCM 404 suitable for use in PTU 108. DDCM 404 includes a first, second and third port 408a, 408b and 410, with each of the ports being configured to couple to an electrical conductor of a cable segment. For example, the first port 408a may be configured to couple to a first electrical conductor of branch cable 104. Second port 408b may be configured to couple to a second electrical conductor of branch cable 104 and the third port 410 may be configured to couple to the electrical conductors downstream in branch cable 104. DDCM 404 may be configured to extract current from one or both of the first and second ports 408a, 408b, to provide power to the branch via the third port 410.

As further shown, the DDCM 404 includes a clamp 502, first and second converters 504-1, 504-2, controller 506, rectifier 514, filter 516, and clamp 508. The controller 506 may be powered via a power supply in the power and telemetry unit 402 of PTU 108. In some cases, the controller 506 may be implemented within the power and telemetry unit 402 and may not necessarily be a separate component as shown. The controller 506 may be implemented as a microprocessor, processor, circuitry, a field programmable gate array (FPGA), or any other suitable controller device. The first and second converters 504-1, 504-2 may be configured to produce a regulated DC voltage, and then may chop the regulated DC voltage to produce an AC signal. Although only first and second converters are shown in FIG. 5, it should be realized that multiple converters may be used. The AC may then go through the transformer for isolation and then may be rectified and filtered via the rectifier 514 and filter 516, respectively, to produce a DC output. The output section of the DDCM may be configured with multiple stages. The clamp 508 on the output may ensure that the cable is discharged for worker safety, for example. The clamp 502 on the input diverts surge current around the converter (e.g., to provide a pass-through) during a cable fault. The clamp 502 may also clamp to ground on each trunk cable to protect workers when making repairs to respective trunk cables.

The first and second converters 504-1, 504-2 may thus provide two power stages. Each of the first and second converters 504-1, 504-2 may include a boost converter (not shown) and a chopper (not shown). The first and second converters 504-1, 504-2 may be configured with a halfbridge (e.g., two transistor configuration) or full-bridge (e.g., four transistor configuration) switching arrangement, for example. Each of the first and second converters 504-1, 504-2 may be operated by, for example, soft switching via the controller 506, e.g., PWM signals, to steer some portion of the line current from one or both of the first and second ports 408a, 408b, depending on the current operating mode. Other power regulation schemes are within the scope of this disclosure and this disclosure is not necessarily limited to PWM implementations. In addition, a common transformer may be utilized with magnetic flux adding power at the output stage. In any event, the first and second converters 504-1, 504-2 may feed the boosted current to a chopper, with each respective chopper driving the primary windings of the isolation transformer 530. Isolation transformer 530 may provide galvanic isolation between the first and second ports 408a, 408b and the third port 410.

Each of the boost converters of the first and second converters 504-1, 504-2 may be driven by the controller 506 via a first and second pulse width modulation (PWM) signal, respectively, with the first PWM signal being different than the second PWM signal. The controller 506 may draw an asymmetrical load from each of the first and second ports 408a, 408b based on the first and second PWM signals. The controller 506 may therefore draw a different amount of power from the first and second ports 408a, 408b, to achieve a desired output current/voltage. Each of the first and second converters 504-1, 504-2 may be configured the same, or different, depending on a desired configuration. Regulation of the output, e.g., port 410, is relatively similar to that of a single-input converter with the addition of a control scheme that ensures switching of the first and second converters 504-1, 504-2 to selectively extract current from each of the first and second ports 408a, 408b. Switching in this fashion may ensure that the first converter 504-1 is switched "on" while the second converters 504-2 is switched "off" and vice-versa to prevent input through both ports simultaneously. During the time when each of the converters 504-1, 504-2 is switched "on" current flows through the ports 408a, 408b. By controlling the proportion of time during which the first converter 504-1 is switched on versus the second convert 504-2, the ratio of input currents may be controlled. In an embodiment, the ratio of input currents between the first and second ports 408a, 408b, is not necessarily dependent on the total output load current so long as the duty cycle control, e.g., the first and second PWM signal, for each of the first and second converters 504-1, 504-2, scales the two input current times in such a way that the ratio of input via the first port 408a and the second port 408b is maintained substantially constant. In some cases, the DDCM 404 may output a constant current or constant voltage with an in-cycle switching scheme or other schemes such as a cycle-by-cycle operation. The described embodiment of the DDCM 404 should be considered exemplary only. Other embodiments of DDCM 404 are possible within the intended scope of the invention.

Figure 6:
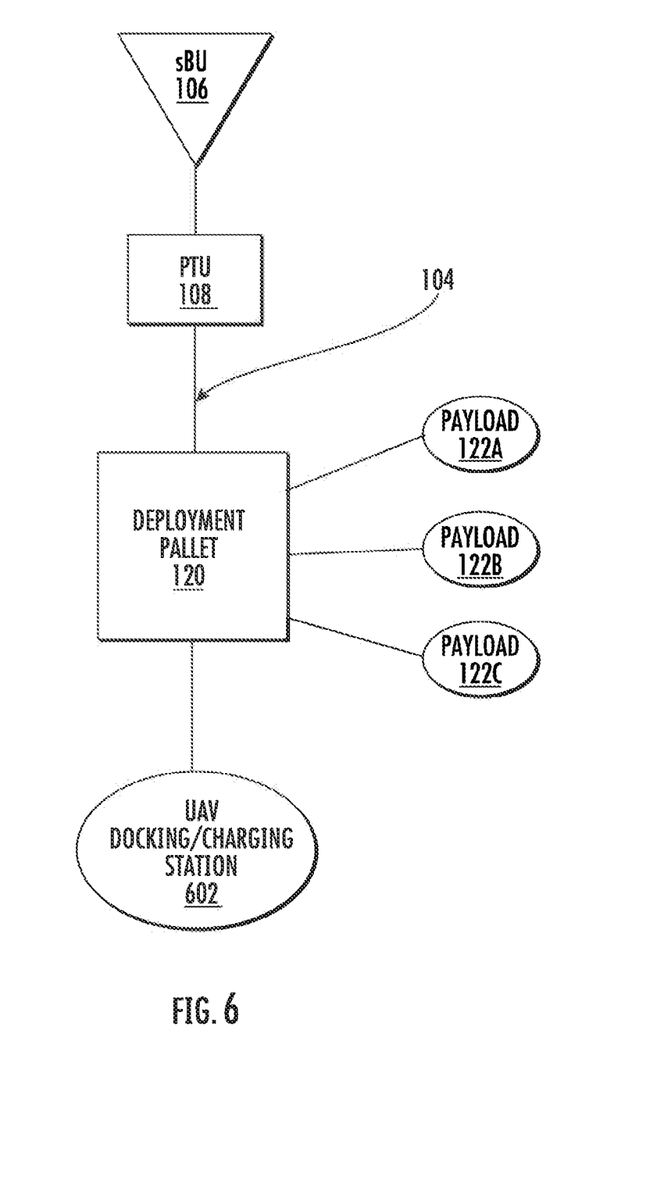
FIG. 6 is a block diagram of branch cable terminating in a deployment pallet to which a docking/charging station is attached as one of multiple payloads.
Figure 7:
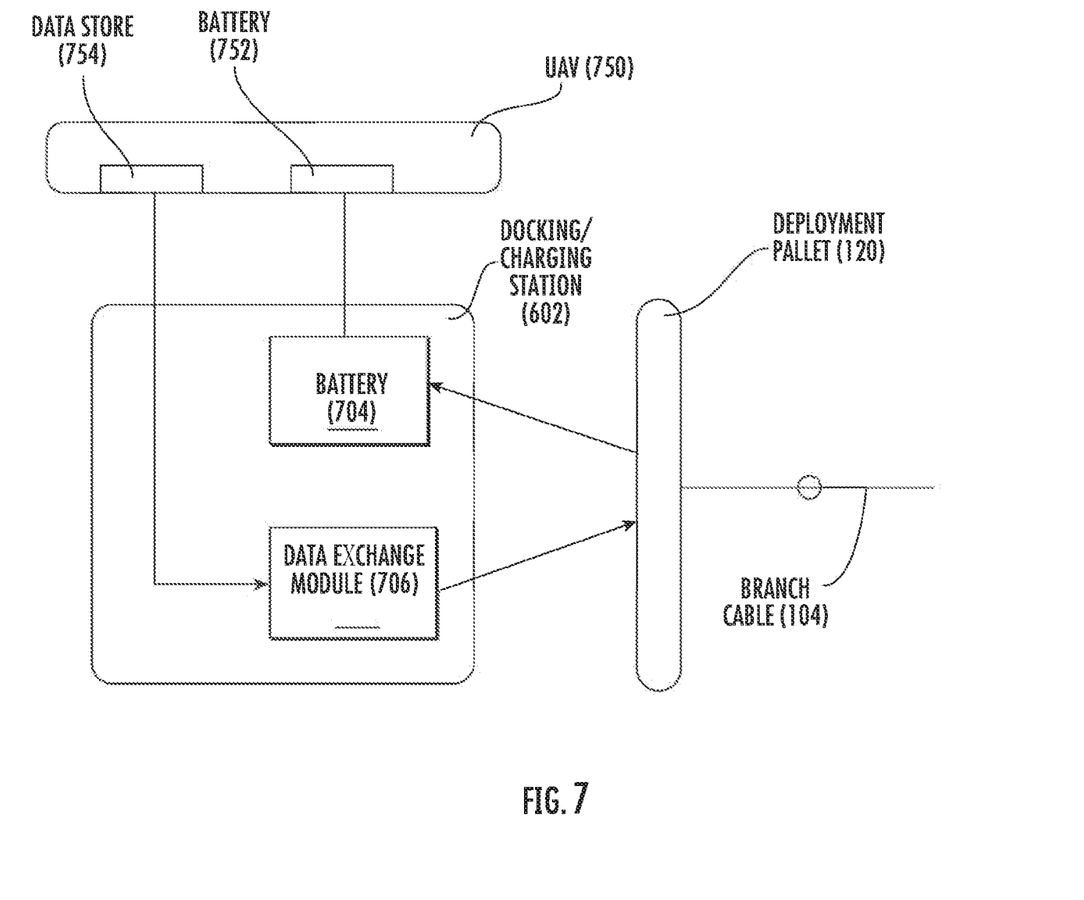
FIG. 7 is a block diagram of the docking/charging station show in FIG. 6, having a UAV docked thereto.

With reference to FIG. 6, one of payloads 122 may be a docking/charging station 602 for a UAV 750, shown in schematic form in FIG. 7 as being docked to docking/charging station 602. UAV 750 will typically comprise battery 752 to provide motive power to UAV 750 as well as to power on board circuitry used for navigation and for controlling the task to be performed by UAV 750. UAV 750 may also comprise data store 754 containing data collected by UAV 750 while detached from docking/charging station 602.

With further reference to FIG. 7, docking/charging station 602 may be connected to deployment pallet 120 and may be configured with battery 704 which may be slowly charged while UAV 750 is undocked from docking/charging station 602. Because branch cable 104 has a finite capacity to deliver power, battery 704 may be charged slowly over time while UAV 750 is undocked. When UAV 750 docs with docking/charging station 602, battery 752 in UAV 750 may be charged rapidly from battery 704 in docking/charging station 602.

In addition, docking/charging station 602 may be fitted with data exchange module 706 to transmit data collected by UAV 750 and stored in data store 754 over the optical cables contained in branch cable 104. Additionally, data and new mission instructions may be transmitted from docking/charging station 602 to UAV 750 while UAV 750 is engaged with the docking/charging station 602 for charging. In some embodiments, deployment pallet 120 may be optional, and branch cable 104 may connect directly to docking/charging station 602.

In addition to the components shown in FIG. 7, docking/charging station 602 may further comprise hardware allowing UAV 750 to engage (dock) with docking/charging station 602. Note that UAV 750 may "engage" with docking/charging station 602 by physically docking or otherwise making one or more physical data and power connections between UAV 750 and docking/charging station 602. In other embodiments, the term "engage" may be interpreted to mean that data and/or power are exchanged wirelessly between UAV 750 and docking/charging station 602. In addition, docking/charging station 602 may be further configured with hardware acting as a beacon or transmitter allowing UAV 750 to easily locate and/or identify docking/charging station 602. In yet other embodiments, the data connection between UAV 750 and docking/charging station 602 may be bidirectional, allowing commands or programming to be sent to the UAV 750 via branch cable 104.

Various embodiments have been generally described. As would be realized by one of skill in the art, the actual implementations of the invention may deviate from the described embodiments but will be within the scope of the invention, as set forth the following claims.

The invention claimed is:

1. A docking/charging module for an undersea autonomous vehicle comprising:
    a housing;
    a connection to an undersea cable having both power conductors and a data connection;
    a battery disposed within the housing, and
    a data transmission module for exchanging data with the underwater autonomous vehicle and with a land-based station via the data connection of the undersea cable;
    wherein the battery is charged via a connection to a land-based power feed via the power conductors of the undersea cable.

2. The docking/charging module of claim 1 wherein the data connection of the undersea cable comprises one or more optical fibers.

3. The docking/charging module of claim 1 wherein the docking/charging module is configured to engage with the undersea autonomous vehicle for transferring power from the battery to the undersea autonomous vehicle.

4. The docking/charging module of claim 1 wherein the connection for transferring power from the battery to the undersea autonomous vehicle is wireless.

5. The docking/charging module of claim 3 wherein the docking/charging module is configured with hardware providing a physical data connection and a physical power transfer connection between the docking/charging module and the undersea autonomous vehicle.

6. The docking/charging module of claim 3 further comprising:
   a connection between the docking/charging module and the undersea autonomous vehicle for transferring data between the docking/charging module and the undersea autonomous vehicle.

7. The docking/charging module of claim 3, the undersea autonomous vehicle having a battery, wherein power is transferred from the battery on the docking/charging module to the battery on the undersea autonomous vehicle when the undersea autonomous vehicle is engaged with the docking/charging module.

8. The docking/charging module of claim 7 wherein the power connection and the data connection to the undersea cable is via a deployment pallet for providing power and data linkages between the undersea cable and the docking/charging module.

9. The docking/charging module of claim 7 further comprising:
   a beacon providing navigational assistance to the undersea autonomous vehicle for locating the docking/charging module.

10. The docking/charging module of claim 1 wherein the data exchange module performs the functions of:
   receiving data collected by the undersea autonomous vehicle and transmitting the data to the land-based station via the undersea cable;
   transmitting data from the land-based station to the undersea autonomous vehicle.

11. A method of providing a quick charge to an undersea autonomous vehicle, comprising:
   navigating the undersea autonomous vehicle to an undersea docking/charging module;
   docking the undersea autonomous vehicle to the undersea docking/charging module, the docking comprising making a physical connection for transferring power from the undersea docking/charging module to the undersea autonomous vehicle;
   transferring power from a charged battery in the undersea docking/charging module to a battery on the undersea autonomous vehicle; and
   disengaging the physical connection;
   wherein the battery in the undersea docking/charging module is charged via a connection to a land-based power feed via power conductors of an undersea cable.

12. The method of claim 11 wherein the undersea docking/charging module is connected to the undersea cable having both power and data connections to a land-based station.

13. The method of claim 12 further comprising:
   transferring data from a data store on the undersea autonomous vehicle to the undersea docking/charging module; and
   transferring the data from the undersea docking/charging module to the ground station or to another device in communication with docking/charging module via the undersea cable.

14. The method of claim 12 further comprising:
   transferring data from the ground station to the undersea docking/charging module via the undersea cable; and
   transferring the data from the undersea docking/charging module to a data store on the undersea autonomous vehicle.

15. The method of claim 12 wherein the battery on the undersea docking/charging module is charged when the undersea autonomous vehicle is disengaged from the undersea docking/charging module.

16. The method of claim 11 wherein navigating the undersea autonomous vehicle to the undersea docking/charging module is guided by a navigational beacon on the undersea docking/charging module.

17. The method of claim 11 wherein the undersea docking/charging module is configured with hardware for physically engaging with the undersea autonomous vehicle and further wherein docking the undersea autonomous vehicle to the undersea docking/charging module comprises making a physical engagement between the undersea autonomous vehicle and the undersea docking/charging module.

* * * * *